UNITED STATES PATENT OFFICE.

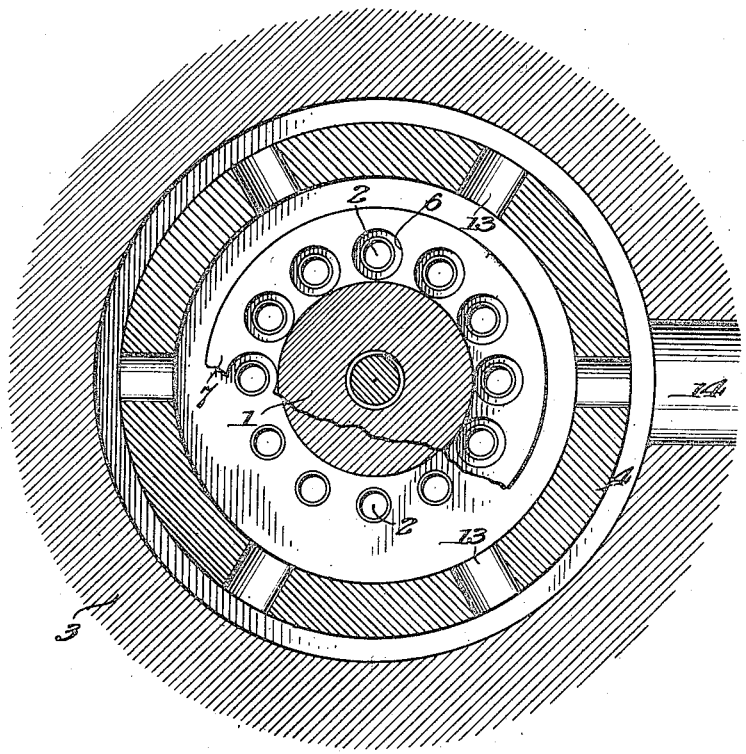

HERMANN BENKERT, OF HAMBURG, GERMANY, ASSIGNOR TO GEORG NIEMEYER, OF HAMBURG, GERMANY.

PUMP-VALVE.

1,173,703.  Specification of Letters Patent.  Patented Feb. 29, 1916.

Application filed December 15, 1913. Serial No. 806,901.

*To all whom it may concern:*

Be it known that I, HERMANN BENKERT, engineer, subject of the Emperor of Germany, residing at Hamburg, Germany, have invented certain new and useful Improvements in Pump-Valves, of which the following is a specification.

The present invention relates to valves, in particular for high speed compressors.

The invention consists in that balls are used as valve-members under the action of a common resilient plate, which serves as spring dish. In order to permit this, the balls must lie free of the guide. They are guided by a perforated plate acting as a cage.

The object of the present invention is to obtain at a minimum weight of the moving masses a perfect and constant tight seating of the valves and as short an opening and movement as possible. With high-speed compressors, in particular in such in which the air is at the same time compressed to an extraordinarily high degree, a perfect and constantly tight seating and as short an opening and closing of the valves are an essential requirement. These requirements can be fulfilled in a permanent manner, only when, according to the present invention, all balls are under the action of a common, resilient plate, or spring dish. This resilient plate must from the first be so fitted and be so made, that each ball is in contact with it and is under its action. The plate must insure that not a single ball has any play; as this, which hitherto occurred with all known systems, will immediately cause a knocking which, with the velocities and forces occurring, must in a short time lead to deformation or even destruction of the parts. By the common resilient plate a permanently perfect and uniform opening and closing of the valves without any knocking whatever is obtained. The balls are, besides, guided in a cage, so that the difficulty of their catching is out of question. The cage is made in form of a disk in which a recessed bore of circular opening corresponds to each valve passage or each ball valve. The cage disk is made of such a thickness, that the balls lie free of the guide. The axis of the bore of the passage in the valve must, of course, coincide with the axis of the corresponding hole in the cage disk. For insuring this the valve seat is made in one operation with the cage disk, and either the cage disk is cut from the solid by turning out the respective parts in a suitable manner, or the valve seat body is rigidly secured to the disk, and the two are then jointly turned and finished. Each valve passage must be bored in one operation with the corresponding cage hole in the cage disk.

In the accompanying drawing a constructional form of the new valve is exemplified.

Figure 1:
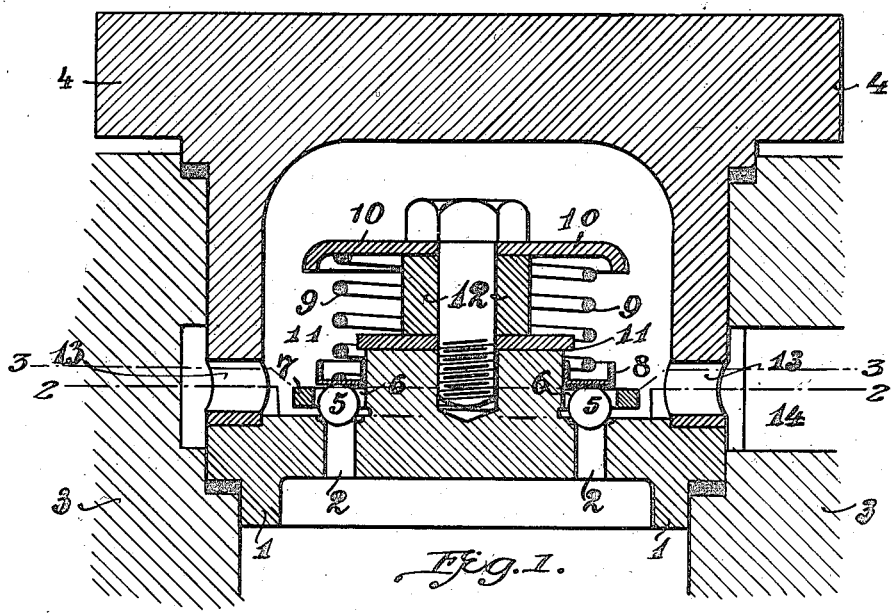
Figure 2:
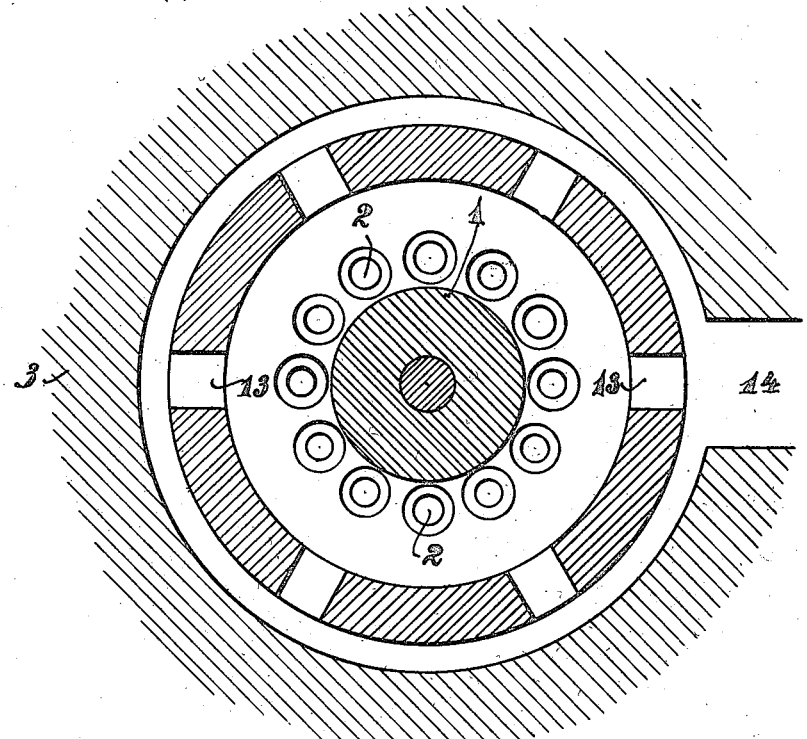

Figure 1 is a vertical section taken through the valve, and Fig. 2 is a view on line 2—2 of Fig. 1. Fig. 3 is a horizontal section taken on line 3—3 of Fig. 1, a portion being broken away for greater clarity.

In this drawing the numeral 1 indicates the valve seat body, in which the valve passages 2 are provided in form of cylindrical bores. The valve body is fitted in a casing 3, and is held in position by a cap 4. Each of the bores 2 is closed by a ball 5, which is guided in a corresponding bore 6 in the disk 7 serving as cage. The ball valves stand under the pressure of a common plate 8, which is under action of the spring 9. The one end of the spring 9 bears against the ring-shaped plate 8, which has a U-shaped section, while the other end of the spring bears against an abutment plate 10 which is secured to the valve seat body by means of a nut or the like. The ring-shaped plate 8 is guided on a cylindrical, turned part of the valve seat body. For limiting the stroke of plate 8 a ring-shaped abutment disk 11 is provided.

12 is a distance piece, which is fitted between the plates 10 and 11.

In the cap 4 passages 13 are provided for the medium to be conveyed, which passages lead into a circular chamber and the passage 14 communicating therewith.

In place of the ball hereinbefore mentioned also cylindrical bodies or the like may, under circumstances, also be employed.

I claim:

1. A valve for high speed compressors, comprising in combination, a valve body having a plurality of valve openings, balls seated over said valve openings, a plate resting commonly over said balls, resilient means for bearing said plate upon said balls, and a cage surrounding said balls so as to permit free vertical movement of the latter.

2. A valve for high speed compressors, comprising in combination, a valve body having a plurality of valve openings, balls seated over said valve openings, a member bearing equally upon all of said balls, a resilient means acting on said bearing-member to maintain said balls on their seats, and a guide-cage for preventing horizontal displacement of said balls, but permitting their free vertical movement.

3. A valve for high speed compressors, comprising in combination, a valve body having a plurality of valve openings, balls seated over said valve openings, an annular member having a face bearing equally on all of said balls, a spring bearing upon the upper face of said annular member to keep said balls seated, and a plate having recesses corresponding to said valve openings into which said balls and through which they may operate, without vertical interference, said plate preventing lateral displacement of said balls.

In testimony whereof I have affixed my signature in presence of two witnesses.

HERMANN BENKERT.

Witnesses:
ERNEST H. L. MUMMENHOFF,
EDUARD HOPF.